P. KUHN.
TRAIN STOPPING SYSTEM.
APPLICATION FILED OCT. 28, 1913.
1,213,660.
Patented Jan. 23, 1917.
7 SHEETS—SHEET 1.
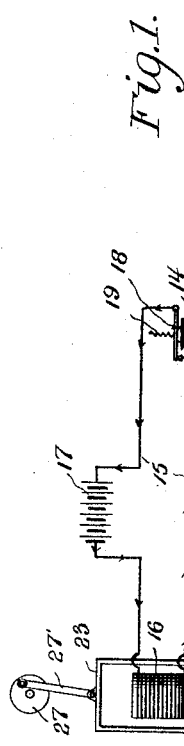
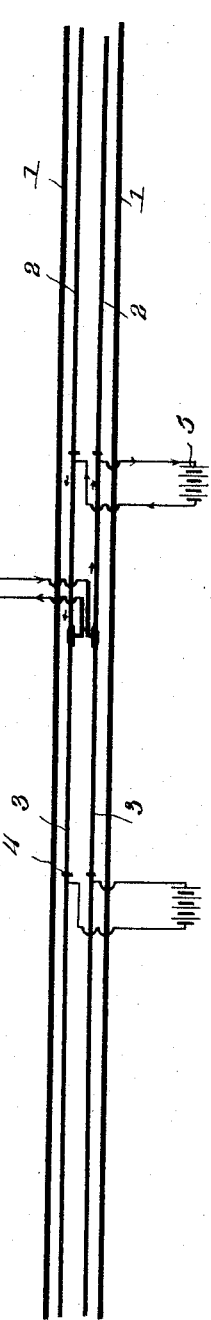
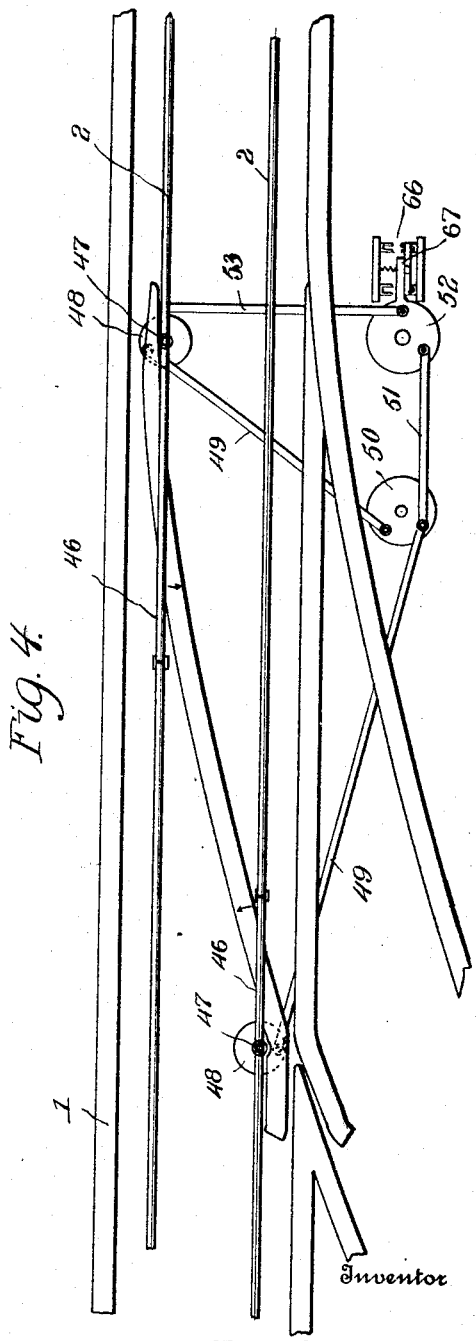
Witnesses
W. Smith
John J. McCarthy
Inventor
P. Kuhn,
By Victor J. Evans
Attorney

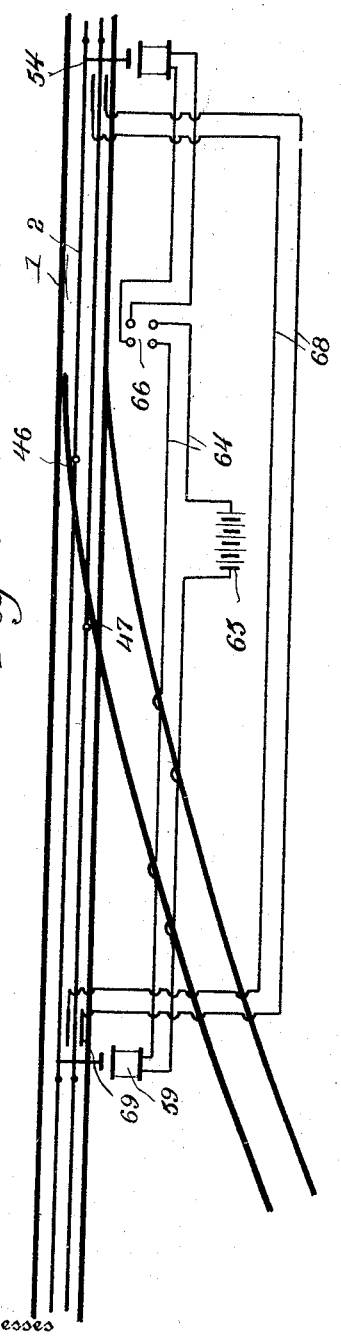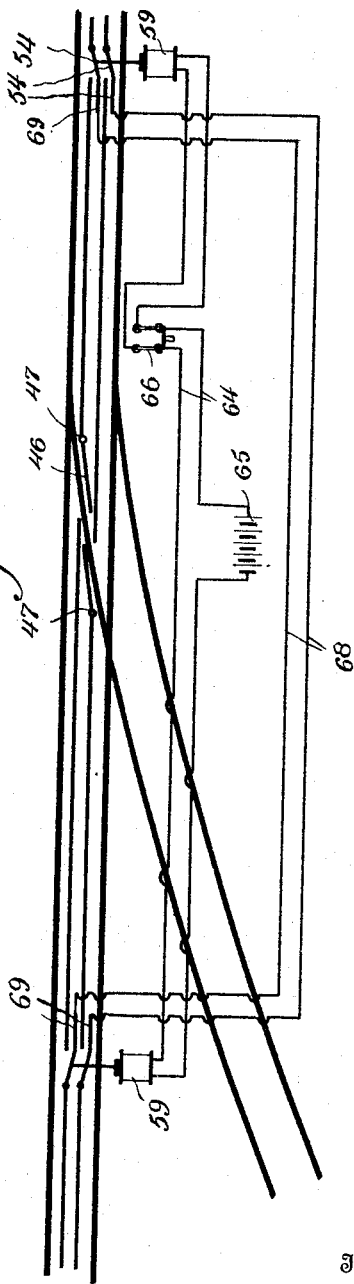

P. KUHN.
TRAIN STOPPING SYSTEM.
APPLICATION FILED OCT. 28, 1913.
1,213,660.  Patented Jan. 23, 1917.
7 SHEETS—SHEET 3.
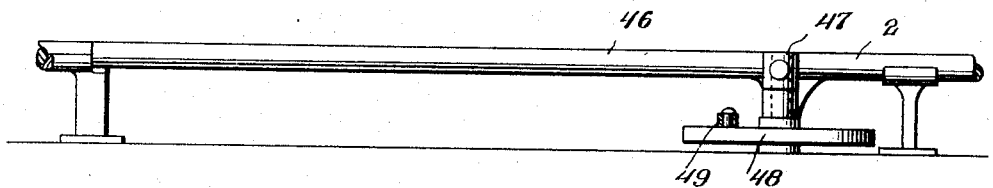
Fig. 5.
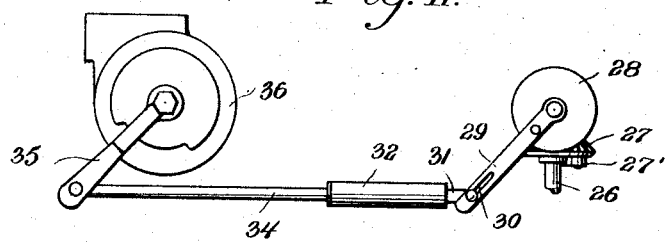
Fig. 11.
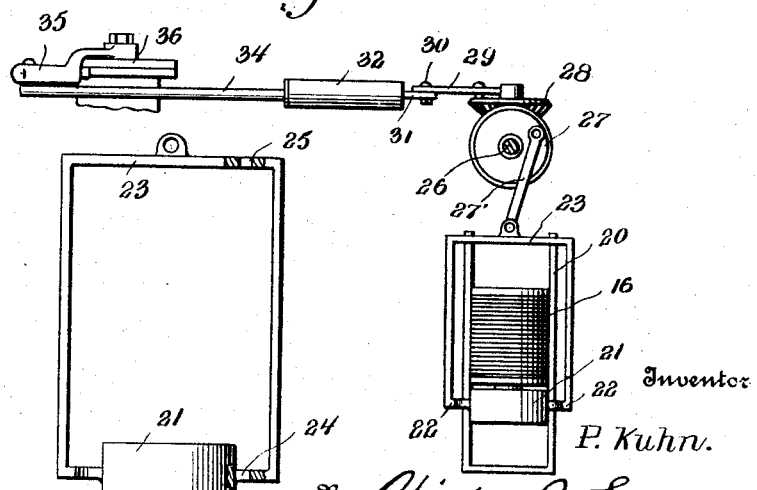
Fig. 10.
Fig. 12.
Witnesses
W. Smith
John J. McCarthy
Inventor
P. Kuhn.
By Victor J. Evans
Attorney

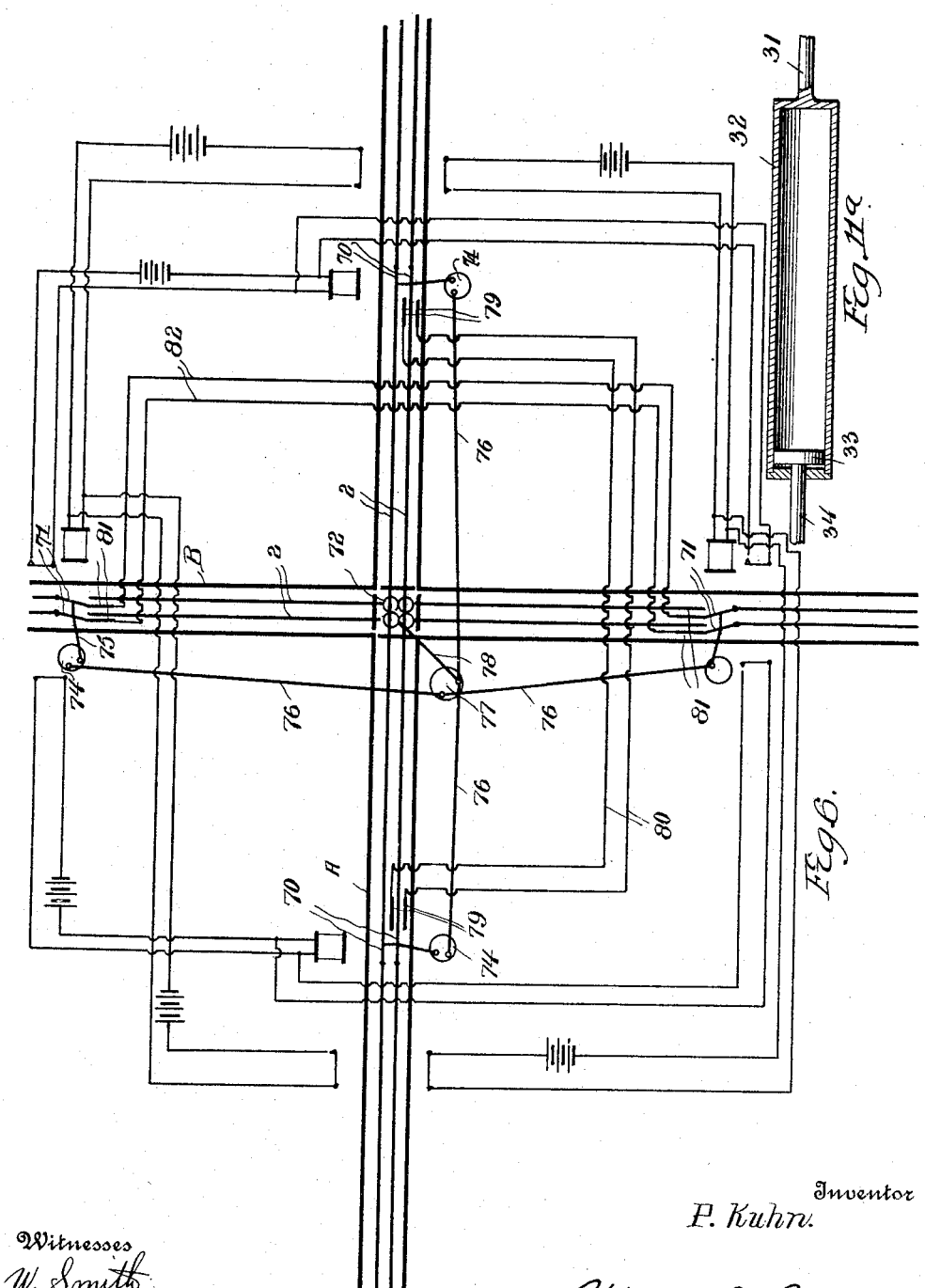

P. KUHN.
TRAIN STOPPING SYSTEM.
APPLICATION FILED OCT. 28, 1913.
1,213,660.
Patented Jan. 23, 1917.
7 SHEETS—SHEET 5.
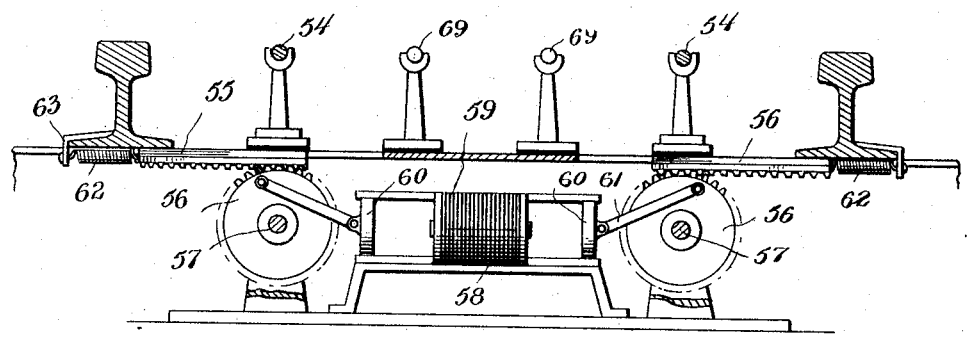
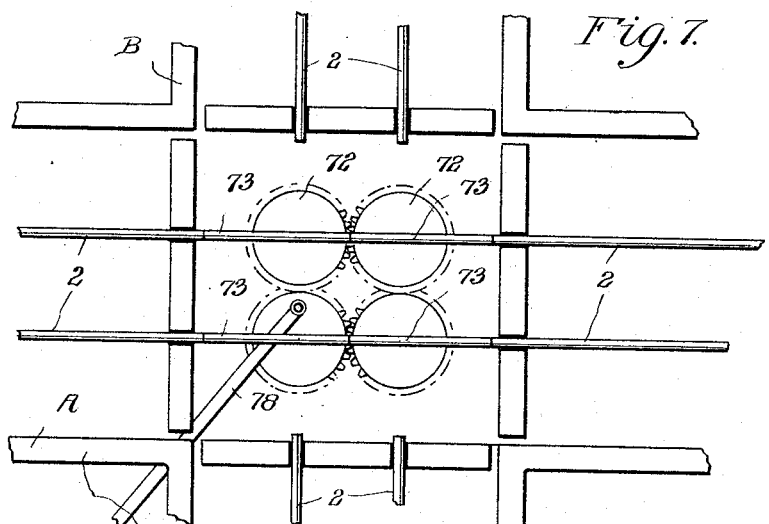
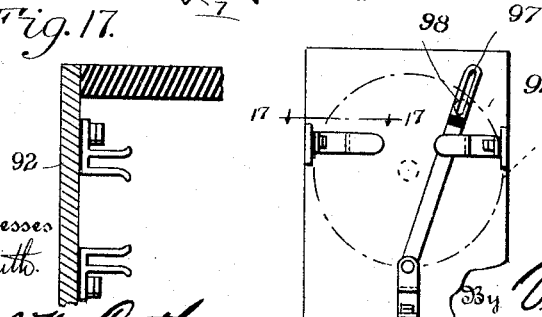
Inventor
P. Kuhn.
Witnesses
W. Smith.
John J. McCarthy
By Victor J. Evans
Attorney P. KUHN.
TRAIN STOPPING SYSTEM.
APPLICATION FILED OCT. 28, 1913.
1,213,660.
Patented Jan. 23, 1917.
7 SHEETS—SHEET 6.
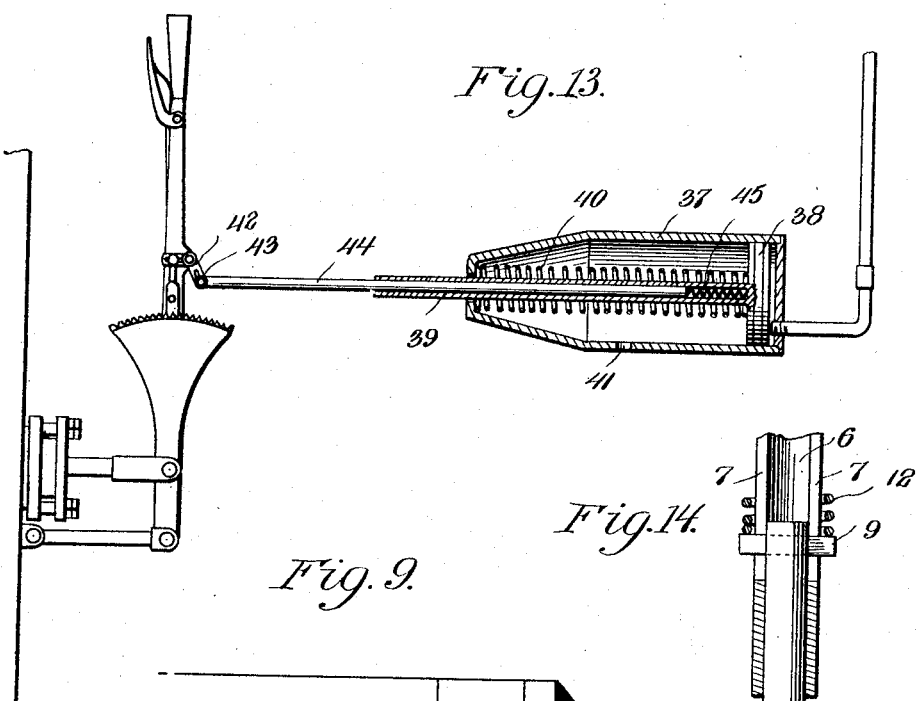
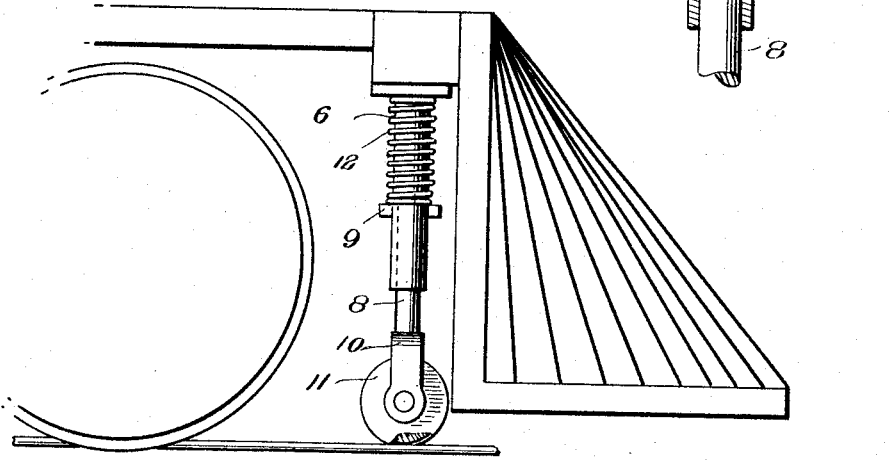
Witnesses
W. Smith
John J. McCarthy
Inventor
P. Kuhn.
By Victor J. Evans
Attorney

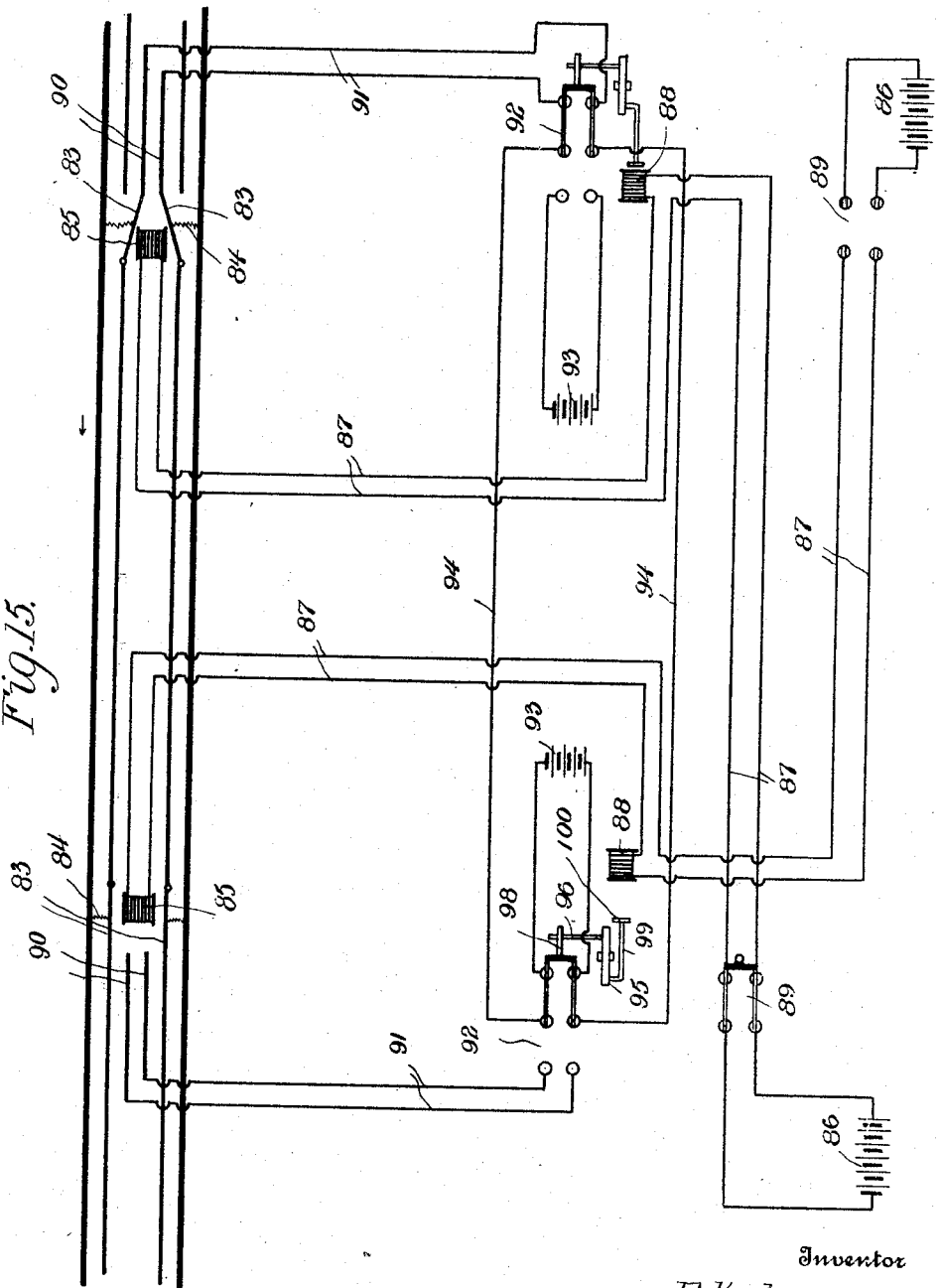

UNITED STATES PATENT OFFICE.

PRESTON KUHN, OF HAMMOND, OREGON.

TRAIN-STOPPING SYSTEM.

1,213,660.	Specification of Letters Patent.	Patented Jan. 23, 1917.

Application filed October 28, 1913. Serial No. 797,849.

*To all whom it may concern:*

Be it known that I, PRESTON KUHN, a citizen of the United States, residing at Hammond, in the county of Clatsop and State of Oregon, have invented new and useful Improvements in Train-Stopping Systems, of which the following is a specification.

This invention relates to improvements in automatic train stopping systems and has particular application to a system of the block type.

In carrying out the present invention, it is my purpose to provide an automatic train stopping system of the block type whereby the propelling mechanism of the car or train as the case may be may be rendered inactive and the brakes applied in the event of such car or train entering an occupied block.

It is also my purpose to provide an automatic train stopping system wherein the car carried stopping mechanism will be under the control of and held normally inactive by the normally closed electric circuit and wherein such circuit will be automatically broken in the event of the car or train entering an occupied block or entering the zone of an open switch, thereby rendering the car carried stopping mechanism active to bring the car or train to a standstill.

Furthermore, I aim to provide a train stopping system of the class described whereby a car or train coming within the zone of a grade crossing will be automatically brought to a standstill in the event of a car or train passing over the crossing or having entered the crossing zone ahead of the first-mentioned train.

A further object of the invention is the provision of a system of the type set forth wherein the operators in charge of the stations or signal towers along the trackway may reënergize the controllers of the stopping devices carried by the cars or trains subsequent to the deënergization of such controllers, thereby permitting the engineer of the car or train to regain control of the propelling mechanism and brakes so that the car may proceed.

With the above and other objects in view, the invention consists in the construction, combination and arrangement of parts hereinafter set forth in and falling within the scope of the claims.

In the accompanying drawings; Figure 1 is a diagrammatic view of an automatic train stopping system of the block type constructed in accordance with my present invention. Fig. 2 is a similar view showing the arrangement of the circuits at a switch, the switch being closed. Fig. 3 is a view similar to Fig. 2 showing the switch points in open position. Fig. 4 is a fragmentary plan view of the switch and associated mechanism. Fig. 5 is a fragmentary side elevation of one of the track conductors at the switch. Fig. 6 is a diagrammatic plan view showing the arrangement of the circuits at a grade crossing. Fig. 7 is a fragmentary plan view of the crossing and associated parts. Fig. 8 is a transverse sectional view through the trackway showing the means for opening and closing the circuit at the danger zone. Fig. 9 is a fragmentary side elevation of a locomotive showing one of the contact rollers or trolley wheels in engagement with the track conductors. Fig. 10 is a view in side elevation of the controller of the car carried stopping mechanism and a connection between such controller and the engineer's brake valve. Fig. 11 is a top plan view thereof. Fig. 11$^a$ is a fragmentary sectional view through the connection between the controller and the engineer's brake valve. Fig. 12 is a view in side elevation of a detail of the controller. Fig. 13 is a longitudinal sectional view through the device for operating the throttle lever, the connection between such device and the lever being illustrated. Fig. 14 is a fragmentary sectional view through the connection between one of the trolley wheels and the body of the locomotive or car. Fig. 15 is a diagrammatic view showing the method of control for the operators in the signal towers. Fig. 16 is a view in side elevation of one of the switches shown in Fig. 15. Fig. 17 is a fragmentary sectional view on the line 17—17 of Fig. 16 looking in the direction of the arrow.

Referring now to the accompanying drawings in detail, 1, 1 designate parallel lines of rails forming a trackway, while 2, 2 indicate conductors capable of carrying an electric current and disposed between the lines of rails of the trackway. These conductors are spaced apart in parallelism and extend throughout the length of the trackway and each is composed of a plurality of sections 3 arranged in axial alinement and having the confronting ends thereof insulated from one aonther as at 4, the points of insulation in each conductor being arranged side by side with those of the other conductor and acting to divide the trackway into blocks. In the present instance, I have shown my improved automatic train stopping system as used in conjunction with a trackway over which the rolling stock travels in one direction only, as indicated by the arrow in Fig. 1, and connected to the opposite sections 3, 3 at the exit end of each block are the opposite poles of a suitable source of electrical energy, such, for instance, as a battery 5, as clearly illustrated in Fig. 1 of the drawings.

Depending from each locomotive or other motor car operating over the trackway and spaced apart transversely of the lines of rails a distance equal to that between the conductors 2, 2 are sleeves 6 each formed at diametrically opposite points with elongated slots 7, 7. Slidably mounted within each sleeve and extending downwardly therefrom is a stem 8 equipped at its upper end with a cross piece 9 having the opposite extremities thereof disposed within the alining slots 7, 7 and carrying at its lower end a yoke 10 in which is journaled a trolley wheel or contact roller 11 contacting with and capable of riding over the adjacent conductor 2. Surrounding each sleeve 6 is a coiled expansion spring 12 having the upper end thereof abutting the frame of the motor car and the lower end in engagement with the opposite ends of the cross piece 9, such springs acting to hold the contact rollers in snug engagement with the conductors 2, 2 and permitting such rollers to vibrate or move vertically in order to compensate for any inequalities in the conductors.

Electrically connected with the contact rollers or trolley wheels 11, 11 in any suitable manner are wires 13 extending through the coil or winding of an electromagnet 14. By means of this construction, it will be seen that as the motor car proceeds from block to block the electric current from the batteries 5 will be continually fed to the coil or winding of the magnet 14 thereby maintaining the latter energized under normal traffic conditions. It will be understood that the insulation 4 between the ends of the sections 3 of the conductors 2 is such that the trolley wheels or contact rollers are continuously in electrical engagement with the conductors 2, 2 in the travel of the car. If desired, the ends of the sections constituting the electric current carrying conductors may overlap.

The electromagnet 14 upon each car controls a local circuit 15 including the magnet winding or coil 16 of a controller, a source of energy as a battery 17 and an armature 18 disposed within the influence of the poles of the magnet 14 and holding the local circuit 15 closed as long as the magnet 14 is energized, a contractile spring 19 being connected with the armature 18 and acting to swing the latter to circuit opening position upon the deënergization of the magnet 14.

In the present instance, the controller of the stopping mechanism on each car comprises a substantially U-shaped strap 20 having the opposite limbs secured to the magnet 16 at diametrically opposite points and the interconnecting member depending below the lower pole face of the magnet. Slidably mounted within the space between the pole face of the magnet 16 and the interconnecting member of the U-shaped strap 20 is a weighted armature 21 connected at diametrically opposite points with the inturned ends 22 of the opposite limbs of an inverted U-shaped strap 23. The inturned ends 22 and the interconnecting member of the strap 23 are formed with alining openings 24, 25 respectively through which the limbs of the strap 20 pass. Thus, the strap 23 may slide vertically upon the limbs of the strap 20, the yoke 23 descending, when the magnet 16 is deënergized, under the action of the weight 21, while when the magnet is energized the weight moves upwardly against the action of gravity and so elevates the yoke 23.

The straps 20 and 23 and the magnet 16 of the controller are arranged in a vertical plane and supported within the motor car or cab of the engine in any suitable manner, while journaled upon a horizontal stub shaft 26 within the motor car above the controller is a bevel pinion 27 meshing with a similar pinion 28 carried upon a vertical shaft and having extending radially therefrom a horizontal arm 29 connected through the medium of a pin and slot connection 30 with one extremity of a rod 31 fast to one end of a cylinder 32. Slidably mounted within the cylinder 32 is a piston 33 having the piston rod 34 thereof connected with the handle 35 of the engineer's brake valve 36. A link 27' has one end fastened to the interconnecting member of the strap 23 and the opposite end secured to the rear face of the pinion 27 eccentrically thereof so that in the downward movement of the strap 23 under the action of the weight 21 rotary motion will be transmitted to the pinion 27. In the running position of the engineer's brake valve the piston 33 is at the end of the cylinder 32 adjacent to the valve 36 so that the engineer may swing the valve to service and emergency positions with ease and facility, the piston 33 sliding toward the opposite end of the cylinder in these movements of the valve. As previously stated, the magnet 14 is energized under normal traffic conditions and the local circuit 15 on each car closed so that the magnet 16 therein is normally energized. Thus, the weighted armature 21 is held elevated and the engineer's brake valve 36 under the control of the engineer or motorman. However, when abnormal traffic conditions arise, as for instance, the presence of a train in a block in which another motor car or train enters behind the first train, the magnet 14 on both trains are deënergized, incident to the drop in voltage across the terminals of the particular battery 5. As the magnet 14 on each train becomes deënergized the armature 19 is actuated to circuit opening position and the local circuit 15 broken whereby the magnet 16 is deënergized so that the weighted armature 21 is released and permitted to gravitate to lowered position. In the downward movement of the armature 21 and strap 23, rotary motion is transmitted to the bevel pinion 27 through the medium of the link 27', thereby rotating the pinion 28 with the effect to swing the arm 29, cylinder 32 and piston 33 therein to a position to throw the engineer's valve to emergency position whereby the pressure in the brake pipe is reduced and the brakes applied to the wheels.

Tapped onto the exhaust of the brake pipe of the air brake system of the motor car is a cylinder 37 within which is mounted for sliding movement a piston 38 having a hollow piston rod 39 extending outwardly from the end of the cylinder opposite from that connected with the exhaust of the brake pipe. Surrounding the hollow piston rod 39 within the cylinder 37 is a coiled expansion spring 40 having one end abutting the piston 38 and the opposite end in engagement with the confronting end of the cylinder, such spring acting to hold the piston 38 in normal position and against the action of the incoming air. The side wall of this cylinder 37 at an appropriate distance from the end thereof connected with the exhaust of the brake pipe is formed with an exhaust port 41 whereby the air from the brake pipe may be discharged to the atmosphere succeeding the movement of the piston 38 and the uncovering of the exhaust port 41 thereby. The cylinder 37 is located in close proximity to the lever controlling the throttle valve and pivoted upon such lever is a bell crank lever 42 having one limb thereof connected through the medium of a pin and slot connection with the latching dog on the throttle lever and the opposite end connected by means of a pin and slot connection 43 with one end of a rod 44 mounted within the hollow piston rod 39. Interposed between the inner end of the hollow piston rod 39 and the confronting end of the rod 44 is a shock absorbing spring 45. By means of this construction, it will be seen that when the engineer's brake valve is operated as previously described to bleed the train line air pipe, the air exhausted from the brake pipe will be fed into the cylinders 37 and so slide the piston 38 therein against the action of the spring 40. In the initial sliding movement of the piston 38, the shock absorbing spring 45 is compressed and in the further movement of the piston the rod 44 is actuated to first throw the locking dog of the throttle lever out of engagement with the quadrant and subsequently swing the throttle lever to closed position. Succeeding the closing of the throttle valve the piston 38 uncovers the port 41 so that the cylinder 37 is placed in communication with the atmosphere whereby the train line air is discharged into the atmosphere.

As illustrated in Figs. 2, 3 and 4, the electric current carrying conductors 2, 2 are disposed in a plane above the points of a switch controlling traffic from the main line to a siding or branch line and in order that the flanges of the car wheels may follow the switch points when the switch is open without mutilating the conductors 2, 2 each of such conductors has the portion thereof passing directly over the switch point formed of a movable section 46 having one end thereof fixed upon a rotatable post 47 and the opposite end abutting the adjacent end of the main portion of the conductor. These pivoted conductor portions are designed to swing inwardly, as illustrated by the arrows in Fig. 4 and as shown in Fig. 3 to clear the switch point when the latter is open and to swing such portions of the conductors simultaneously with the opening of the switch and restore the same to conductor formation with the closing of the switch, a wheel 48 is keyed to the lower end of each pivot post 47 and is provided with an upstanding crank pin to which is fastened one end of a link rod 49. The free ends of the link rods 49 are secured to crank pins extending upwardly from a jack wheel 50 and the latter is connected through the medium of a link 51 with a wheel 52 operable through suitable mechanism to swing the switch points to open and closed position, the wheel 52 being connected to the movable switch point by means of a link rod 53. As the wheel 52 is rotated to throw the movable switch point to open position (as shown in Fig. 3) so that traffic may proceed from the main line onto the siding or branch line, motion is transmitted through the link 51 to the jack wheel 50 and the latter through the medium of the link rods 49, 49 rotates the wheels 48 whereby the pivot posts 47 are revolved to swing the respective sections 46 of the conductors inwardly or toward each other to clear the switch whereby the flanges of the car wheels may follow the switch rails without contacting with the conductor rails, as is readily apparent from Fig. 3 of the drawings.

In order that the electrical continuity of the conductors 2, 2 of the block, within which the switch is installed, will be established and the portions of the conductors at opposite sides of the switch disconnected from the electrically connected portions of such conductors so that the controller of a motor car approaching an open switch will be deënergized when the car enters the zone of the switch and the car or train as the case may be brought to a standstill before reaching the switch, I connect in the conductors 2, 2 at each side of the switch movable sections 54, 54 each pivoted at one end and having the opposite end abutting the adjacent extremity of the main portion of the respective conductor.

Fastened to the under surfaces of the adjacent pivoted sections 54, 54 and insulated therefrom are rack bars 55 arranged transversely of the trackway and having the under toothed surfaces thereof meshing with pinions 56 journaled upon horizontal shafts 57 carried by suitable bearings arranged below the trackway. Interposed between the pinions 56, 56 is a frame 58 carrying an electromagnet 59 having the opposite ends thereof formed with poles and disposed within the influence of the poles of the magnet 59 are armatures 60 adapted for sliding movement within suitable guides carried by the frame 58 and each connected with the adjacent pinion 56 through the medium of a link 61 having one end pivoted to the armature and the opposite extremity to a crank pin carried by one face of the respective pinion. Coiled contractile springs 62, 62 each has one end fastened to the outer extremity of one of the rack bars 55 and the opposite end secured to a bracket 63 depending from the base of the adjacent rail, such springs acting to hold the rack bars normally against movement under the action of the pinions 56, the armatures 60 and the magnet 59 and in normal or conductor forming position. The magnets 59, 59 disposed at the opposite sides of the switch points are connected in an electric circuit 64 including a suitable source of electrical energy as a battery 65 and a double pole single throw switch 66. The handles of the switch 66 are connected to an arm 67 extending radially from the wheel 52 of the switch throwing mechanism and as the wheel is actuated to throw the switch points to open the switch and swing the portions 46 of the conductors 2 to clear the switch, the electric switch 66 moves to closed position whereby the magnets 59 are energized and the movable sections 54, 54 at the opposite sides of the switch thrown to break the continuity of the conductors 2, 2 at the switch.

Arranged around the track switch is a by-pass comprising conductors 68 having the opposite terminals thereof fastened to contacts 69, 69 disposed in the path of movement of the pivoted sections 54, 54 of the conductors 2, 2 and adapted to be engaged by such sections when the latter are swung under the action of the magnets 59. By means of this construction, it will be seen that the electrical continuity of the portions of the conductors 2, 2 beyond the pivoted sections 54 will be established when the portions of such conductors between the sections 54 and the railway switch are deënergized, thereby permitting a motor car or train to approach within a given distance of the switch without being brought to a standstill. However, when the motor car or train comes within the zone of the switch, such zone being determined by the length of the portions of the conductors between the railway switch and the pivoted sections 54, 54, the magnet 14 of such train will be deënergized incident to the electrical continuity of those portions of the conductors 2 between the sections 54 being broken, and the controller operated to actuate the car carried stopping mechanism whereby the car or train will be brought to a standstill before passing into the open switch.

In Figs. 6 and 7 of the drawings, I have shown an arrangement for protecting cars or trains at grade crossings, A indicating what may be termed the main line or trackway, while B denotes the crossing or intersecting line or trackway. The electric current carrying conductors 2, 2 of the trackway A, at opposite sides of the crossing, are provided with pivoted sections 70, 70 identical in construction to the sections 54, 54 hereinbefore described and operated in a like manner, while the electric current carrying conductors 2, 2 of the intersecting line B are provided with pivoted sections 71, 71 disposed at opposite sides of the crossing and similar in construction to the sections 54 except that the springs 62 are eliminated and operated in a like manner. At the point of intersection of the lines A, B, the conductors 2 of each line are cut off and the confronting ends thereof spaced apart a distance equal substantially to the width of the other line of rails and rotatably mounted between the confronting ends of the conductors 2 of the trackway are a number of gear wheels 72, four being shown in the present instance, meshing one with the other so that all of such wheels will revolve in unison. Fast to the upper surface of each gear wheel 72 is a horizontal conductor section 73 having one end designed to abut the inner end of one of the other sections and the outer end designed to engage the end of one of the conductors 2. Arranged adjacent to each pair of pivoted conductor sections 71 is a rotatable disk or wheel 74 connected with the adjacent pair of sections through the medium of a link rod 75 and connected by a rod 76 with a jack wheel 77 arranged adjacent to the point of intersection of the trackway, the jack wheel being connected through the medium of a link rod 78 with one of the gear wheels 73. Arranged in the path of movement of the pivoted sections 70 in the conductors 2 of the main line A are contacts 79 connected to the terminals of conductors 80 forming a by-pass around the crossing for electric current, while disposed in the path of movement of the pivoted sections 71 in the conductors 2 of the intersecting line B are contacts 81 connected to the terminals of conductors 82 forming a by-pass for the current around the crossing. The magnets controlling the pivoted sections 71 in the conductors 2 of the main line are under the control of cars or trains operating over the intersecting lines, while the magnets controlling the pivoted sections in the conductors of the intersecting line are under the control of cars operating over the line A, as shown in Fig. 6.

In operation, assuming a car or train to be traversing the trackway A and within the zone of the crossing, the magnets controlling the pivoted sections 71 in the conductors 2 of the intersecting line will be energized whereby such sections will be swung out of conductor formation and into engagement with the adjacent contacts 81 thereby electrically connecting the portions of the conductors 2 beyond the pivoted sections 71. As the sections 71 in the conductors 2 of the intersecting line swing under the action of the controlling magnets the adjacent wheels 74 are rotated through the medium of the link rods 75 and so actuate the wheels 74 connected with the pivoted sections 71 in the conductors 2 of the main line to throw such sections into conductor forming position, motion being transmitted to the last-mentioned wheels 74 through the medium of the rods 76 and the jack wheel 77.

In the movement of the jack wheel under the action of the respective wheels or disks 74, motion is transmitted to the gear wheels 72 through the medium of the link rod 78 whereby the conductor sections 73 are swung into alinement with the conductors 2, 2 of the main line thereby electrically connecting the confronting ends of such conductors and clearing the crossing for the passage of the flanges of the wheels of the car or train operating over the line A. Should a train approach the crossing over the intersecting line B while the parts are in the position just described, such train will be brought to a standstill as soon as the same enters the crossing zone, by reason of the fact that the electrical continuity of the conductors 2 in the vicinity of the crossing is broken. The crossing zone is determined by the length of the conductors 2, 2 of the trackway between the pivoted sections 71, 71, and the by-pass formed of the conductors 82 electrically connects the portions of the conductors 2, 2 beyond the pivoted sections 71 so that the car or train as the case may be may approach the crossing within a safe distance. It will be seen that when the controlling magnets of the pivoted sections in the conductors 2, 2 of one trackway are energized and the respective sections swung under the influence thereof to deënergize the portions of the conductors between such sections, the pivoted sections of the conductors of the other trackway will be swung into conductor formation thereby eliminating the need for springs or analogous devices to restore the sections to normal position.

In the diagram shown in Fig. 15 of the drawings, I have illustrated an arrangement whereby a signalman may reënergize the magnet 14 on a train after the train has been brought to a standstill in the vicinity of the station, incident to short circuiting of the track battery of the block. The conductors 2, 2 of each block adjacent to the opposite ends thereof are provided with hinged sections 83 normally held in alinement with the conductors by means of springs 84 and interposed between each pair of hinged sections 83 is an electromagnet 85 connected with the sections in a manner similar to the connection between the magnet 59 and the sections 54 shown in Fig. 8. At the meeting ends of the blocks are stations or signal towers and within each station is a source of electrical energy as a battery 86 connected in a circuit 87 including in series a magnet 88 in the adjacent station controlling the opposite end of the respective block and the magnet 85 at such end of the block, a double pole single throw switch 89 being connected in the circuit 87 at the controlling station. Disposed between the conductors 2 at each end of the block are contacts 90 disposed in the path of the adjacent pivoted sections 83 and designed to be engaged thereby when such sections are swung inwardly under the action of the magnet 85. These contacts 90 are connected to the terminals of wires 91 and the free terminals of the wires are connected to one side of a double pole double throw switch 92 located in the adjacent station. Connected to the opposite side of each switch 92 is a source of electrical energy as a battery 93, while the pivot points of the blades of the switches of the adjoining stations are interconnected by way of wires or conductors 94. Journaled upon a horizontal shaft adjacent to each switch 92 is a wheel or disk 95 provided upon one side and to one side of the center thereof with an outwardly extending pin 96 passed through a slot 97 formed in the handle 98 of the blades of the adjacent switch, while connected to the opposite face of the wheel 95 and at a point diametrically opposite the pin 96 is an arm 99 carrying an armature 100 disposed within the influence of the magnet 88 within the station.

Assuming a motor car or train to be traversing the trackway, in Fig. 15, in the direction of the arrow and the conductor rails of the block within which the train is present to be short circuited from some cause or other and the operator in charge of the station at the left hand side of Fig. 15 should desire to reënergize the magnet 14 on the motor car so that the same may proceed toward the said station, such operator throws the switch 89 whereby current flows from the battery 86 through the circuit wires 87 and the magnets 88 and 85 in the adjacent station and at the opposite end of the block respectively. Upon the energization of the magnet 88 the wheel 95 is rotated and the blades of the double pole double throw switch 92 thrown into engagement with the contacts connected with the wires 91, while the magnet 85, being energized, swings the pivoted sections 83 of the conductor rails into engagement with the contacts 90. The operator in the station at the left of Fig. 15 having thrown the switch 89 manipulates the blades of the switch 92 so that such blades bridge the contacts connected with the wires 94, 94 and the battery 93 thereby placing the battery 93 at the controlling station in communication with the wires 91 in the opposite station whereby the conductors 2, 2 of the respective block are energized so that the train may pass through the block toward the controlling station.

If desired, the meeting ends of the sections of the conductors shown in Figs. 4, 5, 7 and 8 may be equipped with spring contact fingers as shown in Fig. 4 in order to insure the proper electrical contact between the sections when in conductor formation.

From the foregoing description taken in connection with the accompanying drawings, the construction and mode of operation of my automatic train stopping system will be readily apparent.

While I have herein shown and described one preferred form of my invention by way of illustration, I wish it to be understood that I do not limit or confine myself to the precise details of construction herein described and delineated, as modification and variation may be made within the scope of the claims without departing from the spirit of the invention.

I claim:

1. In a railway controlling system, a main line trackway, a switch controlling traffic from the main line trackway to the siding or branch line, conductors extending longitudinally of said main line trackway and spaced apart and composed of sections insulated one from another to divide the trackway into blocks, said conductors lying in a plane above the switch points and having the portions thereof disposed immediately above the switch points mounted for swinging movement, means for swinging such portions in the opening of the switch, sources of energy each having the poles thereof connected with the opposite sections of one of the blocks at one end of the latter, and car carried mechanism under the control of said conductors.

2. In a railway controlling system, a main line trackway, a switch controlling traffic from the main line trackway to the siding or branch line, conductors extending longitudinally of said main line trackway and spaced apart and composed of sections insulated one from another to divide the trackway into blocks, said conductors lying in a plane above the switch points and having the portions thereof disposed immediately above the switch points mounted for swinging movement, means for swinging such portions in the opening of the switch, sources of energy each having the poles thereof connected with the opposite sections of one of the blocks at one end of the latter, car carried mechanism under the control of said conductors, and means for shunting the current around said switch in the movement of the swinging portions of said conductors.

3. In a railway controlling system, a main line trackway, a switch controlling traffic from the main line trackway to the siding or branch line, conductors extending longitudinally of said main line trackway and spaced apart and composed of sections insulated one from another to divide the trackway into blocks, said conductors lying in a plane above the switch points and having the portions thereof disposed immediately above the switch points mounted for swinging movement, means for swinging such portions in the opening of the switch, sources of energy each having the poles thereof connected with the opposite sections of one of the blocks at one end of the latter, car carried mechanism under the control of said conductors, means for breaking the continuity of said conductors at opposite sides of the switch whereby the portions of the conductors within the zone of the switch will be deënergized, and means for shunting the current around the deënergized portions of said conductors and said switch.

4. In a railway controlling system, intersecting lines of rails, a pair of conductors extending longitudinally of each line of rails and cut off at the point of intersection and having the confronting ends of such cut off portions spaced apart a distance approximately equal to the width of the intersecting lines of rails, means associated with each pair of conductors for deënergizing the portions of said conductors within the crossing zone, a by-pass around the crossing of said deënergized portions of the conductors whereby the portions of the conductors beyond the crossing zone will be electrically connected, and means for operating said first-named means to connect said by-pass in circuit with the respective portions of the conductors of one line of rails when a car is within the crossing zone of the other line of rails and actuate said first-named means of the conductors of the occupied line of rails to render said conductors electrically continuous, and means at the point of intersection of said conductors for electrically connecting the confronting ends of the conductors of the occupied line of rails and clearing the intersecting point of the flanges of the car wheels.

In testimony whereof I affix my signature in presence of two witnesses.

PRESTON KUHN.

Witnesses:
P. J. GLANZ,
P. H. KUHN.

Copies of this patent may be obtained for five cents each, by addressing the "Commissioner of Patents, Washington, D. C."